O. M. WOLFF.
LOW TEMPERATURE COOKING DEVICE.
APPLICATION FILED JAN. 7, 1918.
1,279,205. Patented Sept. 17, 1918.
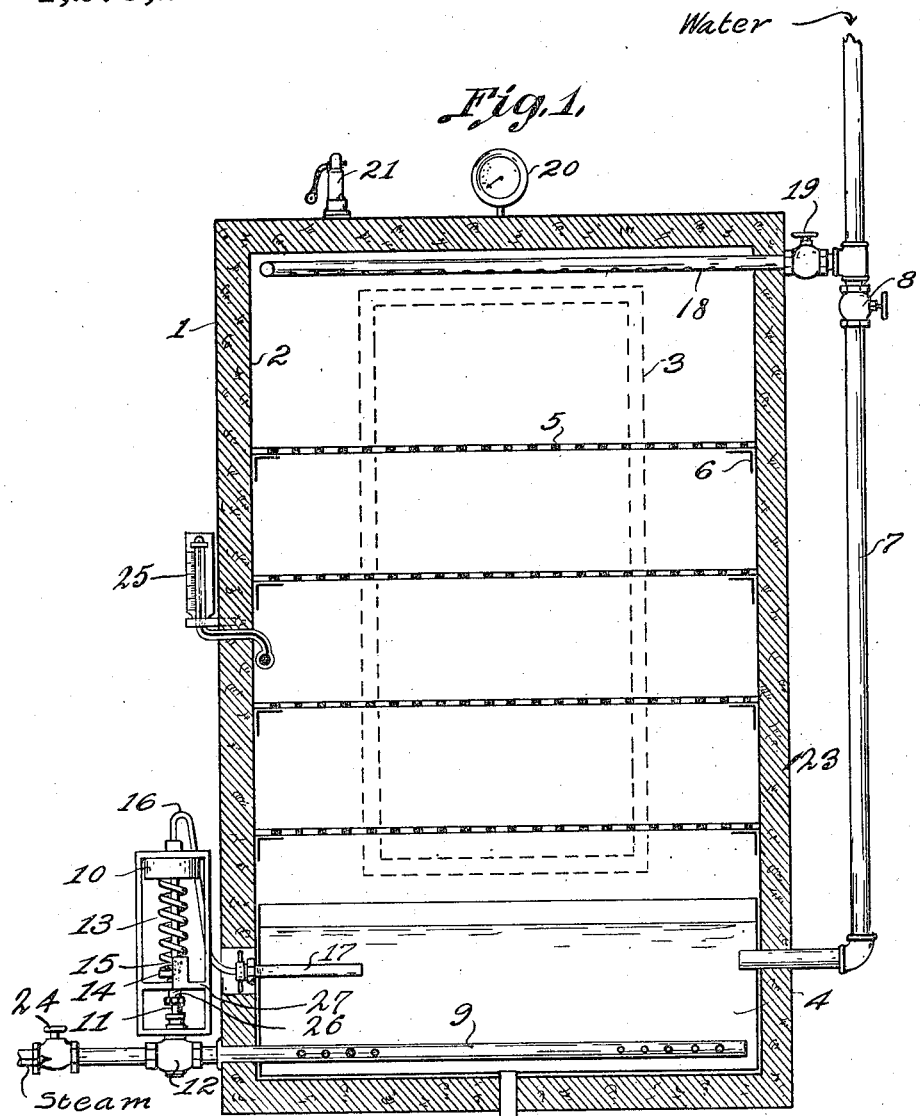
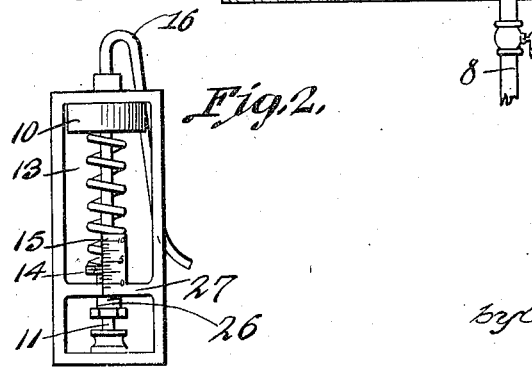
Inventor,
Oscar M. Wolff
by Rummler & Rummler
Attorneys.

UNITED STATES PATENT OFFICE.

OSCAR M. WOLFF, OF CHICAGO, ILLINOIS.

LOW-TEMPERATURE COOKING DEVICE.

1,279,205.   Specification of Letters Patent.   Patented Sept. 17, 1918.

Application filed January 7, 1918. Serial No. 210,703.

*To all whom it may concern:*

Be it known that I, OSCAR M. WOLFF, a citizen of the United States of America, and a resident of Chicago, county of Cook, and State of Illinois, have invented certain new and useful Improvements in Low-Temperature Cooking Devices, of which the following is a specification.

The purpose of this invention is to provide an effective apparatus for low-temperature cooking with the use of steam heat, but not involving any needlessly complicated structure, while using the minimum amount of steam and producing an improved product.

In the accompanying drawings, Figure 1 is a diagrammatic view showing the device in vertical section, with the closing door shown by broken lines; and Fig. 2 is an enlarged detail view of the temperature controlling mechanism.

In general, the construction shown in the drawing comprises a properly insulated double wall cabinet with a water tank in the bottom thereof and a plurality of perforated shelves for supporting the articles to be cooked. The water tank contains six or eight inches of water, and steam is permitted to escape in the water through a perforated inlet pipe, the feed of the steam being automatically regulated by a thermostatically controlled valve, the thermostat being subject to the temperature of the water. The structure involves, in addition to this, merely a drain for the water and a water inlet. The pipe 7 which supplies the water inlet has a branch conduit within the upper end of the cooking cabinet, in order that water may be sprinkled upon the articles within the cabinet, immediately after cooking, by means of this branch conduit, which is perforated for this purpose. The object of so sprinkling the articles being cooked is, in the case of meats such as hams, to chill the meat in order to close the pores thereof and prevent the escape of fats and loss of flavor.

The object of the invention is to overcome certain objectionable features in existing cooking apparatus of this general type, and particularly in the matter of cooking meats such as hams. It is highly desirable to prevent shrinkage of the meat during the cooking operation and also to retain its natural flavor. This may be accomplished by slowly cooking the meats in a moisture laden atmosphere at as low a temperature as 150° F. In the cooking of hams, in order to insure their being cooked thoroughly from the outside to the center, it is necessary to cook them for thirty-five minutes to the pound. Thus, ordinary eight- to ten-pound hams would be cooked within five to six hours. No warm water is allowed to trickle over the meat during the cooking operation, since it would carry away fats and the mineral matter in the meat. After the cooking operation, the meats are, however, suddenly chilled by sprinkling cold water on them.

In the construction shown in the drawing, the cooking cabinet comprises a pair of spaced surrounding walls 1 and 2, the space between the same being filled with insulating material 23 such as ground cork, which is frequently employed in the construction of refrigerators. The door 3 of the cabinet is hinged thereto and has beveled edges in order to afford an air-tight closure. A tank 4 for water is located at the bottom of the cabinet, and above the tank are a plurality of perforated shelves 5 resting on angle bars 6 secured to the side walls of the cabinet. The purpose of perforating the shelves 5 is to allow for the free circulation of the moisture laden air around the articles which are being cooked and which are at rest upon the shelves. In order to facilitate good circulation, it is desirable to place but one layer of articles on each shelf. The tank is filled with water through the pipe 7 under the control of the valve 8. The water is heated to 160° F. in order to produce 150° F. in the cabinet above the water, the temperature being indicated as usual by a thermometer 25. The means for heating the water is a perforated steam pipe 9 through which steam is permitted to escape directly into the water, and accordingly, less steam is required than if the water were heated by a coil through which the steam circulated but did not escape into the water. By this arrangement, steam of any desired temperature may be used to heat the water. The feed of the steam is under the control of an expansion motor 10 which operates the stem 11 of a valve 12, against the action of the spring 13. The tension of the spring 13 is regulated by an adjustable disk member 14, which rests upon a hollow screw 26, surrounding the stem 11, and threaded in the cross-bar 27. By turning the screw 26, the disk member 14 may be raised or lowered as desired. The proper tension of the spring to correspond with the temperature desired may be indicated by an arrow on the member 14, pointing to a division of the scale on the stationary plate 15. A flexible conduit 16 connects the motor with a tube 17 which is closed at its end and contains a fluid which readily changes in volume under slight temperature changes.

At the upper end of the device a sprinkler 18 extends around the inside of the cabinet. This sprinkler is under the control of a valve 19. The device is further provided with a pressure gage 20 and a safety valve 21.

In the operation of the device, water does not come in contact with the articles being cooked until after the cooking operation, although water is employed to regulate the temperature of the air within the cabinet, since by this means the temperature may be accurately controlled through steam.

The water is permitted to flow into the tank 4 to the desired height before the door 3 is closed. After the articles have been placed on the shelf 5 and the door 3 is securely clamped in closed position, the shut-off valve 24 is opened and steam is permitted to enter the valve 12, its further flow through this valve being automatically controlled by the expansion motor 10 which is adjusted to the temperature at which it is desired to maintain the water in the tank 4.

After the cooking operation has extended over the proper length of time, that is, in the case of hams, thirty-five minutes to the pound per average ham, the shut-off valve 24 is closed and the door 3 is thrown open and the valve 19 is opened, causing the articles to be immediately drenched with cold water.

Although but one specific embodiment of this invention has been herein shown and described, it will be understood that numerous details of the construction shown may be altered or omitted without departing from the spirit of this invention as defined by the following claims.

I claim:

1. A cooking apparatus of the class described, comprising a container having heat-insulated walls, a support for articles to be cooked permitting the free circulation therethrough of the air within the container, a tank located below said support, means for supplying water thereto, means for injecting steam into the water only in said tank, thereby producing a moisture laden atmosphere in the container, means for controlling the supply of steam to thereby control the temperature of the heated water and for shutting off the steam when it is desired to open the container, and means for sprinkling water upon the cooked articles while the container is closed to quickly chill said cooked articles.

2. A cooking apparatus of the class described, comprising a container having heat-insulated walls, a support for articles to be cooked permitting the free circulation therethrough of the air within the container, a tank located below said support, means for supplying water thereto, means for injecting steam into the water only in said tank, automatic means for controlling the steam supply to thereby control the temperature of the water, and means for sprinkling water upon the cooked articles within the container to thereby quickly chill them.

Signed at Chicago this 3d day of January, 1918.

OSCAR M. WOLFF.

Copies of this patent may be obtained for five cents each, by addressing the "Commissioner of Patents, Washington, D. C."